(12) United States Patent
Park et al.

(10) Patent No.: US 8,949,422 B2
(45) Date of Patent: Feb. 3, 2015

(54) METHOD, APPARATUS AND SYSTEM FOR PROVIDING CONTENTS TO MULTIPLE DEVICES

(75) Inventors: Hoon Kyu Park, Suwon-si (KR); Jin Han Kim, Gunpo-si (KR); Young Min Chin, Seoul (KR)

(73) Assignee: KT Corporation, Seongnam (KR)

( * ) Notice: Subject to any disclaimer, the term of this patent is extended or adjusted under 35 U.S.C. 154(b) by 221 days.

(21) Appl. No.: 13/228,948

(22) Filed: Sep. 9, 2011

(65) Prior Publication Data

US 2012/0066387 A1 Mar. 15, 2012

(30) Foreign Application Priority Data

Sep. 9, 2010 (KR) .................. 10-2010-0088432

(51) Int. Cl.
*G06F 15/173* (2006.01)
*H04N 21/258* (2011.01)
*H04N 21/433* (2011.01)
*H04N 21/61* (2011.01)
*H04L 29/06* (2006.01)

(52) U.S. Cl.
CPC ....... *H04N 21/25825* (2013.01); *H04N 21/433* (2013.01); *H04N 21/6125* (2013.01); *H04N 21/6131* (2013.01); *H04L 63/08* (2013.01); *H04L 63/202* (2013.01)
USPC ........... 709/225; 709/203; 709/217; 709/219; 709/228; 709/229; 709/231; 725/118; 726/8; 726/18

(58) Field of Classification Search
USPC ................. 709/203, 217, 219, 225, 228–229; 725/118; 726/8, 18
See application file for complete search history.

(56) References Cited

U.S. PATENT DOCUMENTS

| | | | |
|---|---|---|---|
| 8,086,758 B1* | 12/2011 | Allan et al. ................. | 709/253 |
| 8,086,785 B2* | 12/2011 | Pyeon et al. ................. | 711/103 |
| 8,327,428 B2* | 12/2012 | Bailey et al. ................. | 726/8 |
| 2006/0008072 A1* | 1/2006 | Zutler ................. | 379/266.01 |
| 2006/0080702 A1* | 4/2006 | Diez et al. ................. | 725/30 |
| 2008/0127255 A1* | 5/2008 | Ress et al. ................. | 725/38 |
| 2008/0279526 A1* | 11/2008 | Tanaka ................. | 386/65 |
| 2009/0222874 A1* | 9/2009 | White et al. ................. | 725/118 |
| 2010/0199341 A1* | 8/2010 | Foti et al. ................. | 726/9 |
| 2011/0004669 A1* | 1/2011 | Navar et al. ................. | 709/217 |
| 2011/0015968 A1* | 1/2011 | Carlson ................. | 705/10 |
| 2011/0138307 A1* | 6/2011 | Eizadi ................. | 715/760 |
| 2013/0051280 A1* | 2/2013 | Zhang et al. ................. | 370/259 |
| 2014/0032636 A1* | 1/2014 | Nelson ................. | 709/203 |

FOREIGN PATENT DOCUMENTS

| KR | 1020070105562 A | 10/2007 |
|---|---|---|
| KR | 100862153 B1 | 9/2008 |

\* cited by examiner

*Primary Examiner* — Moustafa M Meky
*Assistant Examiner* — Kidest Mendaye
(74) *Attorney, Agent, or Firm* — Sughrue Mion, PLLC

(57) ABSTRACT

In some examples, a contents providing apparatus that provides contents to multiple devices may include a user information management unit, a contents management unit, a contents usage information management unit, and a contents usage information searching unit.

13 Claims, 6 Drawing Sheets

METHOD, APPARATUS AND SYSTEM FOR PROVIDING CONTENTS TO MULTIPLE DEVICES

CROSS-REFERENCE TO RELATED APPLICATION

This application claims the benefit of Korean Patent Application No. 2010-0088432 filed on Sep. 9, 2010, the entire disclosures of which are incorporated herein in its entirety by reference.

FIELD

The present disclosure relates to a method, an apparatus and a system for providing contents to multiple devices and more particularly, relates to a method, an apparatus, and a system for making it possible to use contents obtained through various contents service channels in any kind of contents service system.

BACKGROUND

Conventionally, a media service has been developed in a single platform and provided to a specific client, and a user has used similar services by subscribing to each service if necessary.

Such services includes a service provided thorough a personal computer (PC), a set-top-box-based service provided through a television (TV), and a service provided through a mobile device. The user has subscribed to each service and paid for each service.

For example, if the user purchases contents through a TV at home and wants to enjoy watching the contents outside the home, the user needs to purchase mobile contents from a mobile service provider.

Further, if the user wants to watch contents, which have been watched on TV, through a mobile device, even if the same contents are provided, the user needs to watch the contents from the beginning In connection with this matter, there has been disclosed Korean Patent No. 862,153 entitled "system and method for mobile IPTV service," which relates to a technology in which a user can restart watching a broadcast program, which has been watched on Internet Protocol Television (IPTV), through a mobile device from a point where the user had stopped watching without any key manipulation or any particular checking process.

Although such a technology makes it possible to restart watching contents, which has been watched on IPTV, through a mobile device, this patent document does not disclose a technology in which after a user watches specific contents through a mobile device and stops watching, the user can restart watching the same contents on IPTV from a point where the user had stopped watching and can check records of contents purchased through an IPTV.

That is, regardless of a service system through which a user purchases contents, the user wants to use the same contents and check information of the contents in various service systems, but such wants of the user have not been satisfied.

Thus, there is a demand for a technology capable of, if contents obtained through various contents service channels are the same, continuously providing the contents without purchasing further services regardless of the type of the service system.

SUMMARY

The exemplary embodiments provide a method, an apparatus and a system for continuously providing a user, even if the user uses various contents services such as a mobile service or an IPTV service, through various user devices with contents purchased by the user, regardless of a service system.

An aspect of the present disclosure is not limited to the above description and other aspects of the present disclosure can be clearly understood from the following descriptions.

In accordance with a first aspect of the present disclosure, there is provided a contents providing apparatus that provides contents to multiple devices, the contents providing apparatus including a user information management unit configured to generate a main user ID mapped with a first user ID for authenticating a user of a first service system and a second user ID for authenticating the user of a second service system; a contents management unit configured to assign a same contents ID to contents of a file format for the first service system and the contents of a file format for the second service system; a contents usage information management unit configured to, if receiving from the first service system the user's usage information of the contents, map the received contents usage information onto the main user ID; and a contents usage information searching unit configured to, if receiving from the second service system a request for using the contents from the user, search the main user ID mapped with the second user ID and the contents usage information mapped onto the main user ID, and transmit the contents usage information to the second service system.

In accordance with a second aspect of the present disclosure, there is provided a contents providing method for providing contents to multiple devices, including (a) generating a main user ID mapped with a first user ID for authenticating a user of a first service system and a second user ID for authenticating the user of a second service system; (b) assigning a same contents ID to contents of a file format for the first service system and the contents of a file format for the second service system; (c) providing an application program interface (API) for interworking between services to each of the first service system and the second service system; (d) if the user's usage information of the contents is received from the second service system through the API, mapping the received contents usage information onto the main user ID; and (e) if a request for using the contents from the user is received from the first service system through the API, searching the main user ID mapped with the first user ID and the contents usage information mapped onto the main user ID, and transmitting the contents usage information to the first service system.

In accordance with a third aspect of the present disclosure, there is provided a contents providing system that provides contents to multiple devices, the contents providing system including a first service system configured to authenticate a user with a first user ID and provide contents of a file format for a first service to a first device of the user; a second service system configured to authenticate the user with a second user ID and provide the contents of a file format for a second service to a second device of the user; and a multi-screen service providing server configured to receive from the first service system usage information of the contents used in the first device and provide the usage information to the second service system so as to be used in the second device, wherein the multi-screen service providing server is configured to generate a main user ID mapped with the first user ID and the second user ID, assign a same ID to the respective contents, and map the usage information onto the main user ID.

Details of the present disclosure will be clearly understood from the following exemplary embodiments by reference to the accompanying drawings.

However, the present disclosure is not limited to the following exemplary embodiments and can be modified in various ways. The following exemplary embodiments are provided to make the present disclosure fully disclosed and make those skilled in the art clearly informed of the scope of the disclosure.

In accordance with a method and an apparatus for providing contents to multiple devices, a user may enjoy the same contents from various contents services to which the user subscribes through various user devices as if the user uses a single service.

Further, if the user once purchases contents, the user can play or seamlessly play the same contents through various user devices, and thus, it is possible to reduce unnecessary expenses for purchasing the same contents.

Furthermore, by collecting and managing device information and contents service subscription information of a user, and by integratively managing contents IDs to identify the same contents among multiple contents services, it is possible to share information among the contents services and maximize utilization of contents, and also possible to provide various services to the user.

Moreover, an application program interface (hereinafter, referred to as "API") is provided for interworking between different service systems, and the service systems exchange information through the API with each other, and thus, it is possible to reduce the time needed for a change or an addition to the service systems by modifying the API.

In an exemplary embodiment, there is a contents providing apparatus that provides contents to multiple devices, the apparatus including: a user information management unit configured to generate a main user ID mapped to a first user ID for authenticating a user using a first service system and a second user ID for authenticating the user using a second service system; a contents management unit configured to assign a same contents ID to contents of a file format for the first service system and the contents of a file format for the second service system; a contents usage information management unit configured to map the received contents usage information to the main user ID, if the user's usage information of the contents is received from the first service system; and a contents usage information searching unit configured to, if a request for using the contents from the user, is received from the second service system, search the main user ID mapped to the second user ID and the contents usage information mapped to the main user ID, and transmit the contents usage information to the second service system.

BRIEF DESCRIPTION OF THE DRAWINGS

Non-limiting and non-exhaustive exemplary embodiments will be described in conjunction with the accompanying drawings. Understanding that these drawings depict only several exemplary embodiments in accordance with the disclosure and are, therefore, not to be intended to limit its scope, the disclosure will be described with specificity and detail through use of the accompanying drawings, in which.

DETAILED DESCRIPTION

Figure 1:
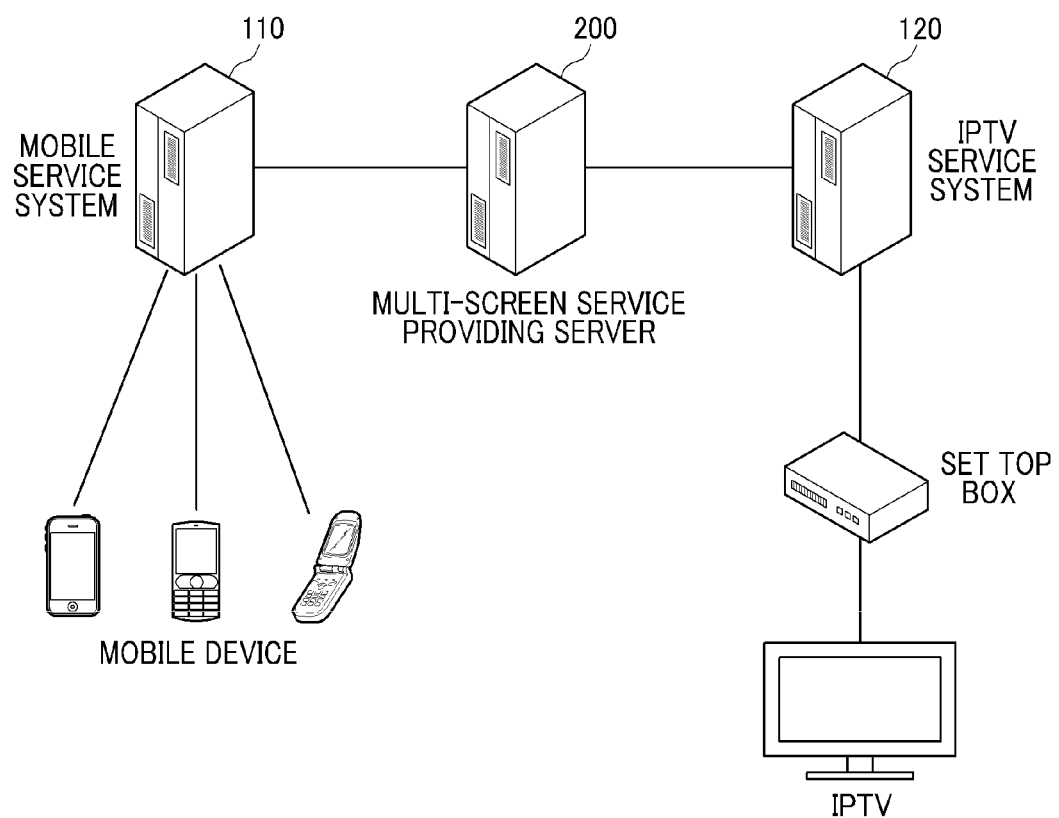
FIG. 1 is a configuration view of a system that provides contents to multiple devices in accordance with an exemplary embodiment of the present disclosure.

Hereinafter, exemplary embodiments of the present disclosure will be described in detail by reference to the accompanying drawings so that the present disclosure may be readily implemented by those skilled in the art.

However, it is to be noted that the present disclosure is not limited to the exemplary embodiments but can be realized in various other ways.

In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Further, the term "comprises or includes" and/or "comprising or including" used in the document means that one or more other components, steps, operation and/or existence or addition of elements are not excluded in addition to the described components, steps, operation and/or elements.

Hereinafter, the present disclosure will be explained in detail by reference to the accompanying configuration view or flowchart.

FIG. 1 is a configuration view of a system that provides contents to multiple devices in accordance with an exemplary embodiment of the present disclosure.

A system that provides contents to multiple devices may include a mobile service system 110, an IPTV service system 120 and a multi-screen service providing server 200.

For reference, the term "multi-screen" from "multi-screen service" described herein means multiple devices having a screen, and thus, the multi-screen service means a service of providing contents to multiple devices, i.e., to multiple screens.

Although a system that provides contents to multiple devices including a mobile service system 110 and an IPTV service system 120, is illustrated, a multi-screen service can be provided to various other service systems. That is, the system that provides contents to multiple devices is not limited to the mobile service system 110 and the IPTV service system 120.

In the system depicted in FIG. 1, mobile service system 110 may manage mobile contents and provide a service to a user, and may have functions of obtaining mobile contents, transcoding, storing and managing mobile contents, managing a category of a mobile contents service, managing a configuration of a mobile contents service, controlling a mobile contents service, authenticating, and providing a mobile device API.

Mobile service system 110 may transmit, to multi-screen service providing server 200, information on mobile contents used by the user.

Mobile service system 110 may receive, from multi-screen service providing server 200, information on contents used by the user in IPTV service system 120, and may provide contents subsequent to the usage of the contents by the user in IPTV service system 120.

By way of example, if the user purchases "movie A" of a video on demand (VOD) service menu from IPTV service system 120 and stops enjoying, i.e., stops the playback of, "movie A", the user may connect the user's mobile device to mobile service system 110 and continue to enjoy, i.e., continue playback of, "movie A."

Mobile service system 110 may have a mobile contents obtaining function for obtaining meta-information and a media file of mobile contents transmitted from a mobile contents provider.

The mobile contents may include a meta-file containing information such as a title, a synopsis, a director and the like, and a media file such as an image file, a post-image, subtitles, a preview and the like. The meta-file may further include information of a name and a size of a media file.

Mobile service system 110 may analyze the meta-file, check whether information of the meta-file is normal and whether all media files recorded in the meta-file exist, and store meta-information and the media files in a meta-information DB and a predetermined storage, respectively.

After obtaining mobile contents, mobile service system 110 may transcode the media files into a necessary format in order to provide the mobile contents to various devices and various services.

When transocding the media files, mobile service system 110 may define a format to be transcoded in each service beforehand and change a format of an original media file based on the defined format, and mobile service system 110 may store the transcoded file in storage.

Multi-screen service providing server 200 may also obtain and register contents and transcode an original media file of the registered contents for each service in the same manner as mobile service system 110. In such cases, mobile service system 110 may receive, from multi-screen service providing server 200, a file transcoded to be appropriate for a mobile service and may store it in storage.

Further, mobile service system 110 may manage the contents file stored in the storage and distribute the media files to multiple media servers (not illustrated).

The media servers (not illustrated) may respectively transmit a media file to various user devices connected to the media servers (not illustrated).

The media file may be transmitted from mobile service system 110 to various mobile devices of the user without passing through the media servers (not illustrated).

Mobile service system 110 may configure a menu by which the user can readily access the registered mobile contents, register mobile contents in each menu, and add a purchase price of mobile contents and information required to use a mobile service.

Then, the mobile service system 110 may transmit the above-described information to a mobile device of the user, and the information may be displayed on the mobile device of the user.

Further, when receiving from the mobile device of the user a request for a menu, a request for contents information or a request for information required to play contents, mobile service system 110 may check whether the user is authenticated and then provide the requested information.

Mobile service system 110 may check, by communicating with an authentication server, whether the user who wants to use a mobile contents service is authenticated to normally use the service.

Mobile service system 110 may provide a mobile device API that makes it possible to interoperate, e.g., interwork, between mobile service system 110 and the mobile device of the user.

The above-described functions of mobile service system 110 are operations for providing the user with a mobile contents service and information thereof, and interoperating with the mobile device of the user can be carried out through the mobile device API.

That is, if the mobile device of the user is connected to mobile service system 110 for using the mobile contents service, mobile service system 110 may authenticate the user and transmit, through an API, information required to configure a screen for using the service.

Mobile service system 110 may provide an API for providing information required to play mobile contents and information requested from a mobile user device for searching, bookmarking or the like.

IPTV service system 120 may manage IPTV contents and provide an IPTV contents service to the user, and may have functions of obtaining IPTV contents, transcoding, storing IPTV contents, managing a category of IPTV contents, managing a configuration of IPTV contents, controlling an IPTV contents service, authenticating, and providing an IPTV service API.

IPTV service system 120 may transmit, to the multi-screen service providing server 200, information on IPTV contents used by the user.

IPTV service system 120 may receive, from the multi-screen service providing server 200, information on contents used by the user in mobile service system 110, and may provide contents subsequent to the usage of the contents by the user in mobile service system 110.

By way of example, if the user purchases "movie A" via a mobile contents service menu in mobile service system 110 and stops enjoying, i.e., stop the playback of, "movie A", the user may connect the user's mobile device to the IPTV service system 120 and continue to enjoy, i.e., continue playback of, "movie A."

IPTV service system 120 may have the functions similar to those of mobile service system 110, and may use IPTV contents instead of mobile contents and an IPTV set top box instead of a mobile user device. Therefore, a detailed explanation of IPTV service system 120 will be omitted.

Multi-screen service providing server 200 may store components commonly required for the user to use a mobile service and an IPTV service, and integrate information of the mobile service and IPTV service.

Then, if multi-screen service providing server 200 receives, from mobile service system 110 and IPTV service system 120, a request for information for providing contents, multi-screen service providing server 200 may transmit the requested information to the corresponding system, so that any service may provide the user with the same information.

In order to do so, multi-screen service providing server 200 may have functions of managing service information, managing users, managing contents, managing contents usage information, and providing a multi-screen service API.

To be specific, multi-screen service providing server 200 may have a function of managing service information by registering a multi-screen service.

In order to use a multi-screen service in mobile service system 110 or IPTV service system 120, the service (for example, a VOD service) needs to be registered and multi-screen service providing server 200 may share information of the service registered at mobile service system 110 or IPTV service system 120.

In such cases, mobile service system 110 and IPTV service system 120 may use the multi-screen service by interoperating with multi-screen service providing server 200 through an API provided by multi-screen service providing server 200.

Multi-screen service providing server 200 may have a function of managing users by assigning a main user ID to each user and mapping various authentication platforms, i.e. user IDs of mobile service system 110 and IPTV service system 120, onto each main user ID.

Therefore, even if the user uses a service with different IDs, multi-screen service providing server 200 may recognize the user as the same user, and continuity between services can be guaranteed.

By way of example, if an ID registered at mobile service system 110 to use a mobile service is "ID_A" and an ID registered at IPTV service system 120 to use an IPTV service is "ID_B," multi-screen service providing server 200 may assign a main user ID "ID_AB" to the user, map "ID_A" and "ID_B" onto "ID_AB," and manage them.

Thereafter, even if the user accesses mobile service system 110 with "ID_A" or IPTV service system 120 with "ID_B," multi-screen service providing server 200 may recognize the user as the same user using the main user ID "ID_AB."

Further, multi-screen service providing server 200 may have a function of managing contents by assigning the same ID to the same contents included in each service.

By way of example, in case of "movie A" of VOD contents, an ID and a file format of the VOD contents managed in mobile service system 110 may be different from an ID and a file format of the VOD contents managed in IPTV service system 120.

Therefore, when multi-screen service providing server 200 obtains the VOD contents from a VOD contents providing server (not illustrated), even if a file format is different in each service, multi-screen service providing server 200 may assign the same ID to the same contents of any service.

Multi-screen service providing server 200 may assign the same ID when obtaining VOD contents as described above, or map different IDs onto a main ID in the same manner as managing users.

Multi-screen service providing server 200 may have a function of managing contents usage information such as information of contents purchased by the user and records of the usage of the contents.

By way of example, the user may log in mobile service system 110 with using the user's ID "ID_A" and purchase "movie A" of VOD contents.

Thereafter, if the user stops playing the contents while enjoying the contents through a mobile user device or finishes enjoying the contents, multi-screen service providing server 200 may receive, from mobile service system 110, the user's ID "ID_A" and "contents usage information" including one or more of an ID, a title, a purchase date and time of the contents and a playback stop point, and may map the received contents usage information onto the main user ID "ID_AB" and store them.

Thereafter, if the user tries to purchase the VOD contents again to enjoy "movie A" with the user's ID "ID_B" from IPTV service system 120, multi-screen service providing server 200 may receive, from IPTV service system 120, the user's ID "ID_B" and a contents ID of "movie A."

Thereafter, multi-screen service providing server 200 may search the main user ID "ID_AB" mapped to "ID_B," and search the contents usage information mapped onto "ID_AB," and then transmit it to mobile service system 110, so that the user may be informed that the user has already purchased "movie A" in mobile service system 110.

Therefore, it may be possible to solve the undesirable problem of purchasing the same contents twice from each service provided through different service systems, and it may also be possible for the user to easily check, through a service system, records of contents already purchased by the user from another service system.

Further, if the user stops playing contents, multi-screen service providing server 200 may manage a playback stop point of the contents with the function of managing contents usage information.

By way of example, if the user stops playing contents or the playing of contents is suddenly stopped due to an instability of a network while enjoying the contents through the mobile service, multi-screen service providing server 200 may receive "contents usage information" from mobile service system 110, map the received contents usage information onto the main user ID, and store them as described above.

Thereafter, if multi-screen service system 200 receives a request for seamlessly playing the contents from IPTV service system 120, multi-screen service system 200 may transmit "contents usage information" to IPTV service system 120 as described above. Since the transmitted "contents usage information" includes the playback stop point of the contents, IPTV service system 120 may transmit, to a user device (set top box) connected to IPTV service system 120, the contents from the playback stop point.

The function of managing contents usage information may be performed based on the functions of managing users and managing contents of multi-screen service providing server 200.

Multi-screen service providing server 200 may have a function of providing a multi-screen service API by providing an API such that mobile service system 110 and IPTV service system 120 may interoperate with multi-screen service providing server 200 to use the above-described multi-screen service.

Figure 2:
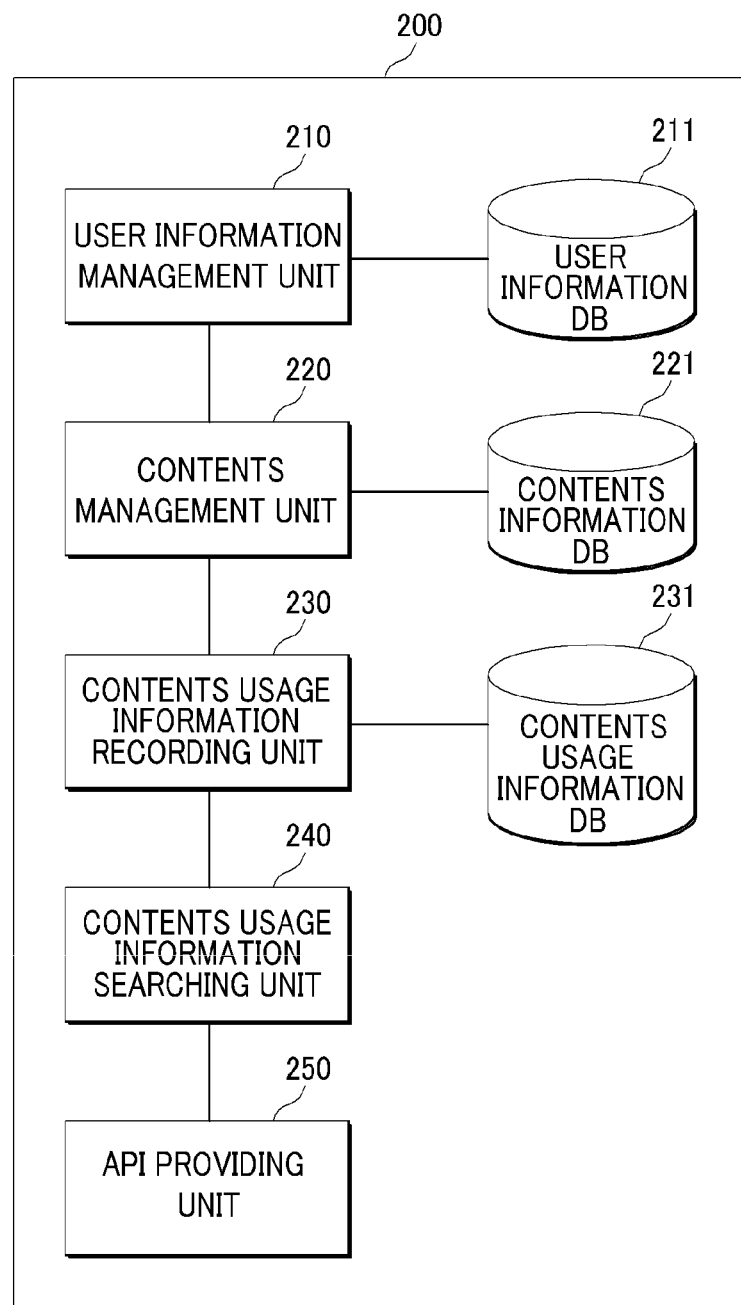
FIG. 2 is a block diagram showing a configuration of a multi-screen service providing server in accordance with an exemplary embodiment of the present disclosure.

FIG. 2 is a block diagram showing a configuration of a multi-screen service providing server 200 in accordance with an exemplary embodiment of the present disclosure.

A multi-screen service providing server 200 in accordance with an exemplary embodiment of the present disclosure may include a user information management unit 210, a contents management unit 220, a contents usage information recording unit 230, a contents usage information search unit 240, and an API providing unit 250.

User information management unit 210 may assign a main user ID to each user, map user IDs of various authentication platforms onto each main user ID, and store them in a user information DB 211.

By way of example, if an ID registered at mobile service system 110 to use a mobile service is "ID_A" and an ID registered at IPTV service system 120 to use an IPTV service is "ID_B," user information management unit 210 may assign a main user ID "ID_AB" to the corresponding user, map "ID_A" and "ID_B" onto the main user ID "ID_AB" and manage them.

Therefore, even if the corresponding user accesses mobile service system 110 with "ID_A" or IPTV service system 120 with "ID_B," the corresponding user may be recognized as the same user using the main user ID "ID_AB."

Contents management unit 220 may obtain and register contents, and may change a file format by transcoding an original media file of the registered contents to be appropriate for each service.

By way of example, if a media file of "movie A" is obtained, contents management unit 220 may transcode the media file to be appropriate for a mobile service such that "movie A" can be served in mobile service system 110 and to be appropriate for an IPTV service such that "movie A" can be served in IPTV service system 120.

Thereafter, contents management unit 220 may assign the same ID to the transcoded contents file for each service and store the ID in a contents information DB 221.

If an ID is assigned to the transcoded contents file for each service, contents management unit 220 may map the contents ID assigned for each service onto a main contents ID.

Details of obtaining, registering and managing contents by contents management unit 220 will be described later by reference to FIGS. 4 and 5.

Contents usage information recording unit 230 may receive, from mobile service system 110 and IPTV service system 120, one or more of contents purchase records and usage information of the user, and store them in a contents usage information DB 231.

Herein, the contents usage information may include one or more of information of a playback stop point in the contents, an ID of the contents, and an ID of the user.

If a connection between mobile service system 110 and a mobile user device or a connection between IPTV service system 120 and an IPTV set top box is abnormally stopped or it is difficult to find a playback stop point in the mobile user device or the IPTV set top box, mobile service system 110 and IPTV service system 120 may transmit information of a playback stop point in the contents, a contents ID, and a user ID to multi-screen service providing server 200.

Contents usage information search unit 240 may receive, from mobile service system 110 or IPTV service system 120, a request for checking the user's contents usage information, search contents usage information of the corresponding user from contents usage information DB 231, and transmit the information to mobile service system 110 or IPTV service system 120.

In order to do so, contents usage information search unit 240 may receive, from mobile service system 110 or IPTV service system 120, one or more of an ID of the corresponding user and a contents ID.

Then, contents usage information search unit 240 may search a main user ID mapped to the received user ID from contents usage information DB 231, search contents usage records of the corresponding user from contents usage information DB 231 based on the searched main user ID, and transmit the records to mobile service system 110 or IPTV service system 120.

If contents usage information search unit 240 receives a user ID along with a contents ID, contents usage information search unit 240 may search a main user ID in the above-described manner, and search a playback stop point of the contents ID from contents usage information DB 231 based on the searched main user ID.

Thereafter, contents usage information search unit 240 may transmit, to mobile service system 110 or IPTV service system 120, the searched for playback stop point of the contents ID, and a user device connected to each service system may play the contents from a playback stop point.

API providing unit 250 may provide an API to mobile service system 110 and IPTV service system 120 for interoperating between services.

Therefore, mobile service system 110 and IPTV service system 120 may interoperate with multi-screen service providing server 200 through the API provided by API providing unit 250 so as to provide a multi-screen service to a user.

If mobile service system 110 or IPTV service system 120 is changed or a new service system is added, by modifying the API provided by API providing unit 250 or adding a new API thereto, a system developing time for changing a service system or adding a new one can be reduced.

The components of the exemplary embodiment of the present disclosure illustrated in FIG. 2 may include software or hardware such as FPGA (Field Programmable Gate Array) or ASIC (Application Specific Integrated Circuit), and may perform predetermined operations.

However, "components" are not limited to software or hardware, and each of the components can be configured to be stored in an addressable storage medium or to execute one or more processors.

By way of example, the components may include components such as software components, object-oriented software components, class components, and task components and processes, functions, properties, procedures, sub-routines, segments of a program code, drivers, firmware, a micro code, a circuit, data, a database, data structures, tables, arrays and variables.

Such components and functions provided in the components may be integrated into a fewer number of components or divided into a larger number of components.

Figure 3A:
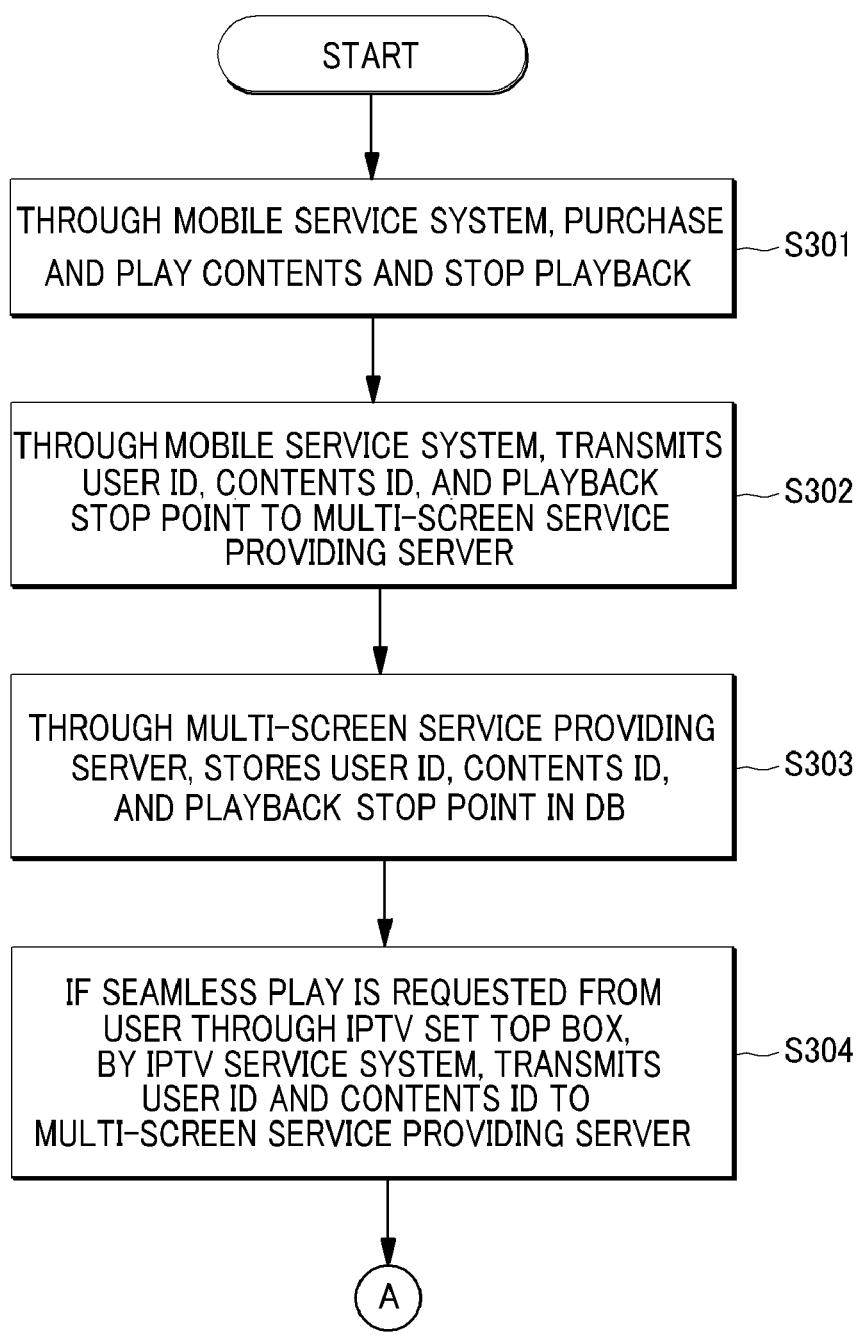
FIGS. 3A and 3B are flowcharts each showing a process of providing contents to multiple devices in accordance with an exemplary embodiment of the present disclosure.
Figure 3B:
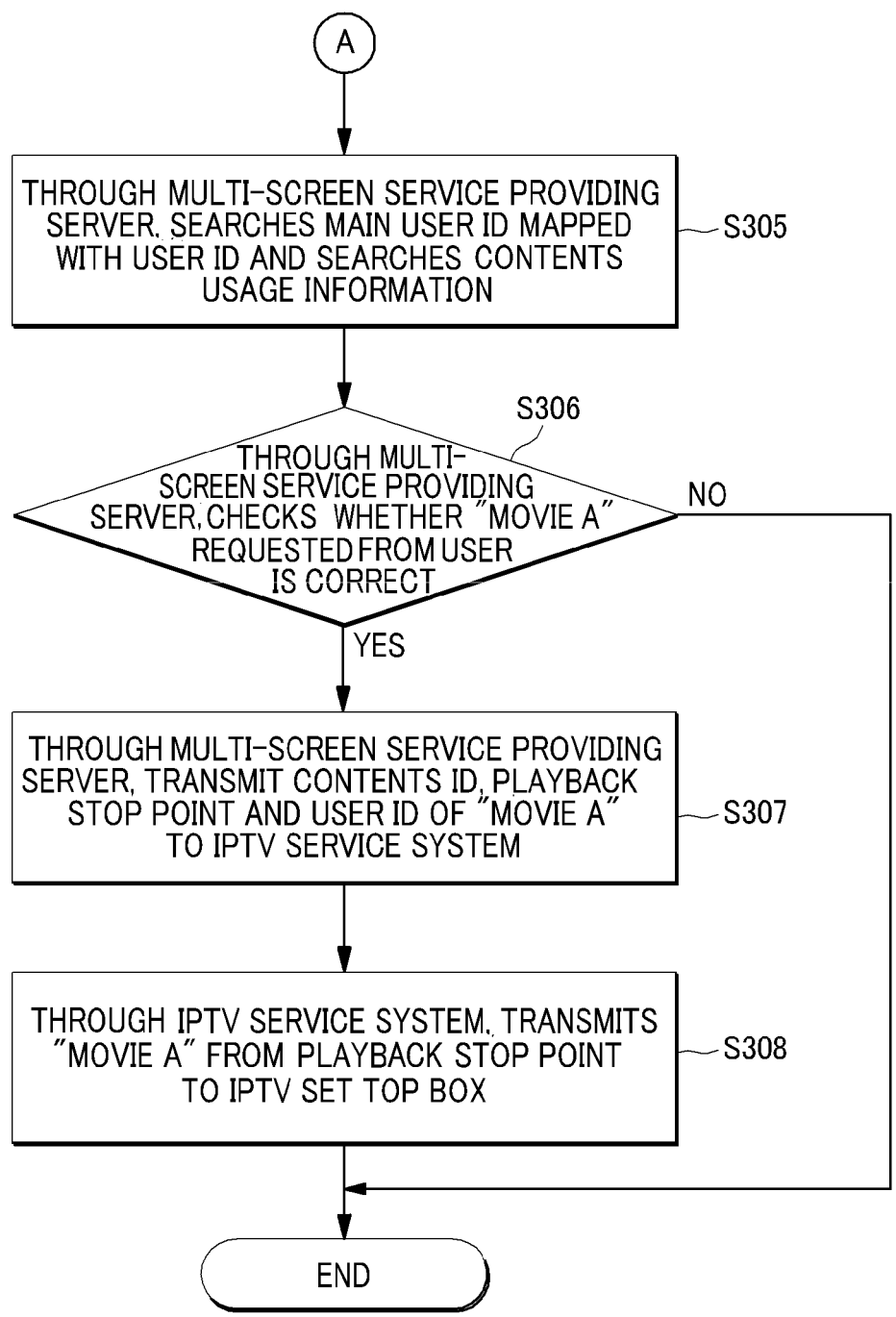

FIGS. 3A and 3B are flowcharts each showing a process of providing contents to multiple devices in accordance with an exemplary embodiment of the present disclosure.

Hereinafter, the flowcharts of FIGS. 3A and 3B will be explained by reference to the components of the system depicted in FIGS. 1 and 2.

A user information DB 211 may store a main user ID mapped to an ID of each user used in a mobile service system 110 and an IPTV service system 120, and a contents information DB 221 may store contents, particularly the same contents provided by both mobile service system 110 and IPTV service system 120 with the same ID.

A contents usage information DB 231 may store one or more of a user ID for each service, a main user ID mapped to the user ID, a contents ID, and playback stop point information of contents.

Mobile service system 110 and IPTV service system 120 may interoperate with a multi-screen service providing server 200 through an API provided by multi-screen service providing server 200 for a process to be described below.

A user may purchase "movie A" of VOD contents from mobile service system 110 through the user's mobile device, and may stop playing the movie (S301).

After operation S301, mobile service system 110 may transmit, to multi-screen service providing server 200, an ID of the user, an ID of the contents, and playback stop point information of the movie (S302).

After operation S302, multi-screen service providing server 200 stores, in contents usage information DB 231, the ID of the user, the ID of the contents, and the playback stop point information of the movie received from mobile service system 110 (S303).

In such cases, multi-screen service providing server 200 may search a main user ID mapped to the user's ID from user information DB 211, and may store the user's ID together with the main user ID in contents usage information DB 231.

After operation S303, the user returning home wants to enjoy, through an IPTV set top box at home, "movie A," which the user watched through the mobile device.

If the user access a multi-screen service menu through the IPTV set top box and makes a request for a seamless play of the movie, IPTV service system 120 may transmit the user ID and the contents ID to multi-screen service providing server 200 (S304).

After operation S304, multi-screen service providing server 200 may search a main user ID mapped to the received user ID from user information DB 211, and search, from contents usage information DB 231, a user ID matching the searched main user ID (S305).

After operation S305, if there is a user ID matching the searched main user ID, multi-screen service providing server 200 may check whether it is "movie A" by checking the contents ID received in operation S304 and the contents ID stored in contents usage information DB 231 (S306).

After operation S306, multi-screen service providing server 200 may transmit the playback stop point information of "movie A," the contents ID and the user ID to IPTV service system 120 (S307).

After operation S307, IPTV service system 120 may transmit, to the IPTV set top box of the user, the contents from a playback stop point based on the contents ID, the playback stop point information of the contents, and the user ID received from multi-screen service providing server 200 (S308).

Although FIG. 3 illustrates that the user enjoy the contents first through the mobile service and then seamlessly plays the contents through the IPTV service, it may be possible for the user to enjoy the contents first through the IPTV service and seamlessly play the contents through the mobile service.

That is, by integratively managing a user's IDs respectively used in multiple service systems and assigning the same ID to the same contents contained in the multiple service systems in different formats, the user can continuously use the contents without repurchasing the contents if the user purchases the same contents from any other service system.

Figure 4:
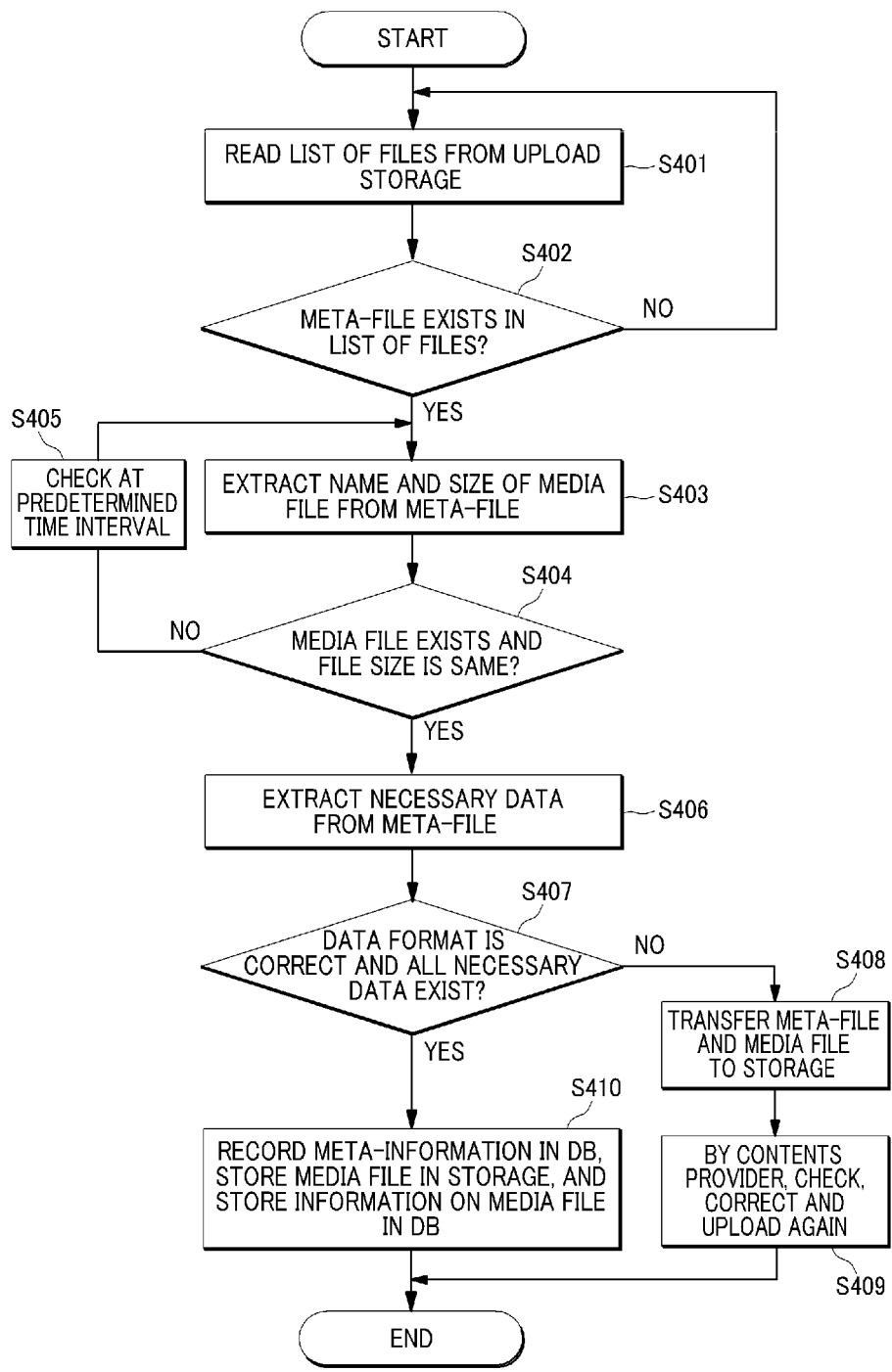
FIG. 4 is a flowchart showing a process of registering contents by a multi-screen service providing server in accordance with an exemplary embodiment of the present disclosure.

FIG. 4 is a flowchart showing a process of registering contents by a multi-screen service providing server 200 in accordance with an exemplary embodiment of the present disclosure.

As depicted in FIG. 4, if a contents provider uploads contents to a predetermined upload storage, a multi-screen service providing server 200 may process the uploaded contents and store the contents in a contents information DB 221.

In such cases, a file uploaded by the contents provider may include a contents meta-file and a media file, and to be specific, the meta-file may contain a contents ID, general information of contents, a name and a size of a media file and the like, and the media file may contain an image file, a post-image, subtitles, a preview and the like.

Multi-screen service providing server 200 may read a list of files from the upload storage (S401), and check whether a meta-file exists in the list of files (S402).

As a result of the check, if the meta-file does not exist in the list of files, that is, not all files have been uploaded normally, multi-screen service providing server 200 may check the list of files at a predetermined time interval.

As a result of the check in operation S402, if the meta-file exists in the list of files, multi-screen service providing server 200 may extract a name and a size of a media file from the meta-file (S403).

After operation S403, multi-screen service providing server 200 may check whether the media file exists in the list of files and whether the size of the media file is the same as that extracted (S404).

As a result of the check, if the media file does not exist or the size of the media file is not the same that as extracted, that is, not all files have been uploaded normally, multi-screen service providing server 200 may check the list of files again at a predetermined time interval (S405).

As a result of the check in operation S404, if the media file exists and the size of the media file is the same as that extracted, multi-screen service providing server 200 may extract necessary data from the meta-file (S406).

After operation S406, multi-screen service providing server 200 may check the data extracted from the meta-file to find whether all the necessary data are extracted and whether a format of the data is correct (S407).

As a result of the check, if there is any problem in the meta-data, multi-screen service providing server 200 may generate an error (signal) and transfer the meta-file and the media file to an error storage (not illustrated) (S408).

After operation S408, the contents provider may check the files kept in the error storage, correct the files, and upload them again (S409).

If all the meta-data are normal as a result of the check in operation S407, multi-screen service providing server 200 may record the meta-information in contents information DB 221, transfer the media file to a predetermined storage (not illustrated), and record information on the media file and a storage location in contents information DB 221 (S410).

Multi-screen service providing server 200 may continuously check whether contents uploaded by the contents provider exist in the upload storage by performing the above-described process at regular intervals.

The contents obtained through the above-described process may be transmitted to mobile service system 110 or IPTV service system 120 through transcoding and distribution.

Figure 5:
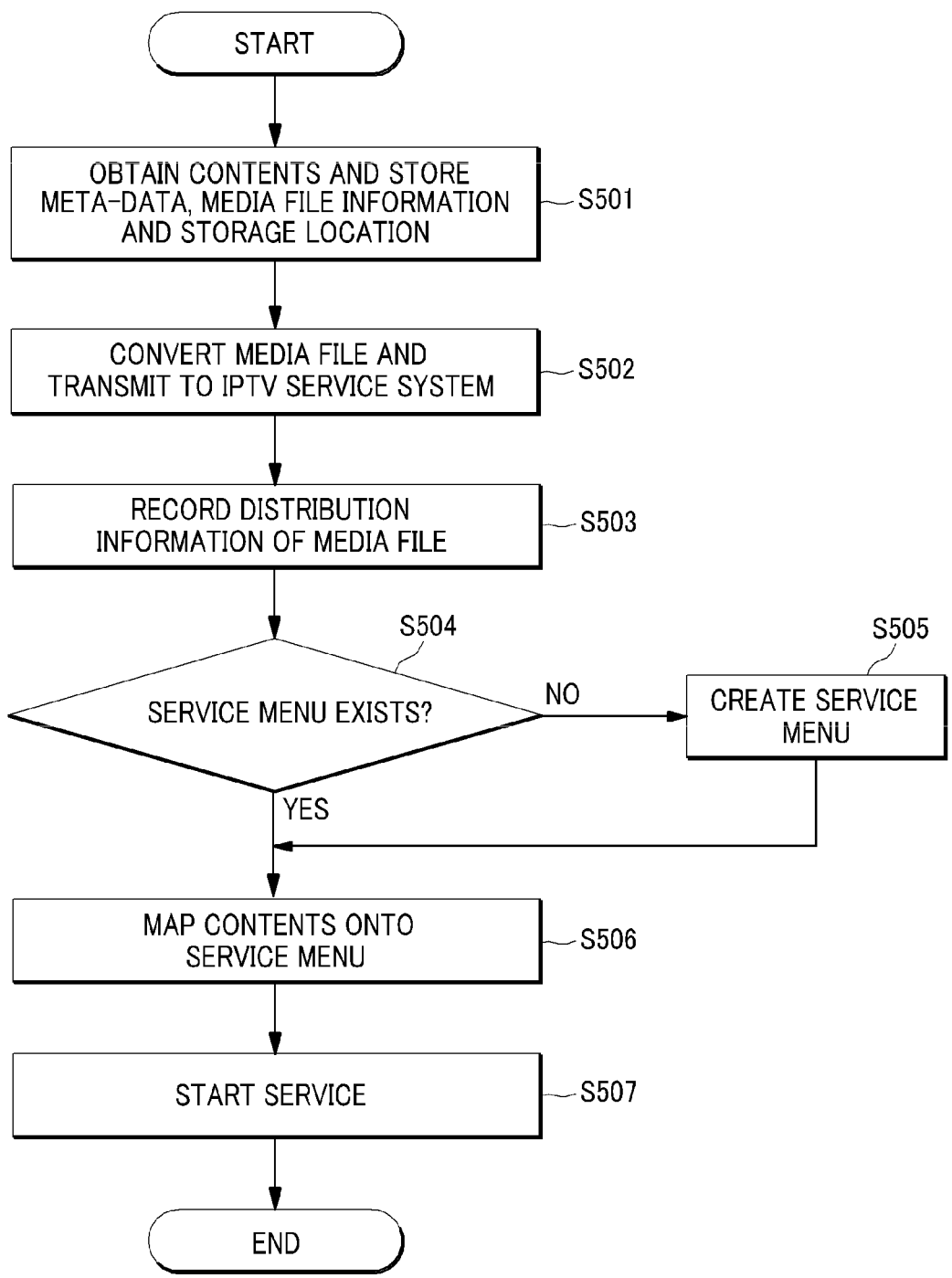
FIG. 5 shows a procedure of managing contents to be provided to various service systems by a multi-screen service providing server in accordance with an exemplary embodiment of the present disclosure.

FIG. 5 shows a procedure of managing contents to be provided to various service systems by a multi-screen service providing server 200 in accordance with another exemplary embodiment of the present disclosure.

A multi-screen service providing server 200 may obtain contents through the process illustrated in FIG. 4, and if meta-information is normal and all media files exist in the contents, multi-screen service providing server 200 may store the media files in a predetermined storage (not illustrated) and information of meta-data and media files and storage locations thereof in a contents information DB 221 (S501).

After operation S501, multi-screen service providing server 200 may convert (transcode) an original media file stored in a predetermined storage (not illustrated) into a format reproducible in each user device, and then transmit the converted file to a mobile service system 110 and an IPTV service system 120 (S502).

After operation S502, multi-screen service providing server 200 may record information of distribution of the media files (S503).

This can be used in a real service when each user device specifies a service system to be connected therewith.

After operation S503, multi-screen service providing server 200 may check whether there exists a service menu displaying contents (S504).

As a result of the check, if there is no service menu and a new service menu needs to be created, a service menu may be newly created (S505).

As a result of operation S504, if there is a service menu, multi-screen service providing server 200 may link (map) contents with (onto) the corresponding service menu (S506).

After operation S506, if the contents are linked with the service menu and the distribution of the media files is finished, a service may be available and multi-screen service providing server 200 may activate the contents (S507).

After operation S507, if the contents are activated, the contents may be checked by each user device and a user may select and use the checked contents.

The above description of the present disclosure is provided for the purpose of illustration, and it would be understood by those skilled in the art that various changes and modifications may be made without changing technical conception and essential features of the present disclosure.

Thus, it is clear that the above-described exemplary embodiments are illustrative in all aspects and do not limit the present disclosure.

For example, each component described to be of a single type can be implemented in a distributed manner. Likewise, components described to be distributed can be implemented in a combined manner.

The scope of the present disclosure is defined by the following claims rather than by the detailed description of the exemplary embodiment. It shall be understood that all modifications and embodiments conceived from the meaning and scope of the claims and their equivalents are included in the scope of the present disclosure.

What is claimed is:

1. A contents providing apparatus that provides contents to multiple devices, the apparatus comprising a memory and a processor and further comprising:
    a user information manager which generates a main user ID mapped to a first user ID for authenticating a user using a first service system and a second user ID for authenticating the user using a second service system;
    a contents manager which assigns a same contents ID to contents of a file format for the first service system and the contents of a file format for the second service system;
    a contents usage information manager which maps the received contents usage information to the main user ID, upon a condition that the user's usage information of the contents is received from the first service system;
    a contents usage information searcher which, upon a condition that a request for using the contents from the user; is received from the second service system, searches the main user ID mapped to the second user ID and the contents usage information mapped to the main user ID, and transmits the contents usage information to the second service system; and
    an application program interface (API) provider which provides APIs to the first service system and the second service system for interoperating between the first service system and the second service system.

2. The contents providing apparatus of claim 1, wherein the contents manager assigns a first ID to the contents of the file format for the first service system and a second ID to the contents of the file format for the second service system and generates a main contents ID mapped to the first ID and the second ID.

3. The contents providing apparatus of claim 2, wherein the contents manager respectively converts an original media file of the contents into the file format for the first service system and the file format for the second service system.

4. The contents providing apparatus of claim 1, wherein the contents usage information comprises one from among a purchase date and time, and a playback stop point of the contents used by the user in the first service system and the first user ID of the user.

5. The contents providing apparatus of claim 4, wherein the second service system is configured to transmit to a user device connected to the second service system, the contents from the playback stop point based on the contents usage information.

6. A contents providing method for providing contents to multiple devices, the method comprising:
    generating, by a content providing apparatus, a main user ID mapped to a first user ID for authenticating a user using a first service system and a second user ID for authenticating the user using a second service system;
    assigning, by the content providing apparatus, a same contents ID to contents of a file format for the first service system and the contents of a file format for the second service system;
    providing, from the content providing apparatus to the first service system and the second service system, an application program interface (API) for interoperating between services to each of the first service system and the second service system;
    if the user's usage information of the contents is received from the second service system through the API, mapping, by the content providing apparatus, the received contents usage information to the main user ID; and
    if a request for using the contents from the user is received from the first service system through the API, at the content providing apparatus, searching the main user ID mapped to the first user ID and the contents usage information mapped to the main user ID, and transmitting the contents usage information to the first service system.

7. The contents providing method of claim 6, wherein the assigning the same contents ID comprises:
    assigning a first ID to the contents of the file format for the first service system;
    assigning a second ID to the contents of the file format for the second service system;
    and generating a main contents ID mapped with the first ID and the second ID.

8. The contents providing method of claim 6, wherein the contents usage information comprises one from among a purchase date and time, and a playback stop point of the contents used by the user in the second service system and the second user ID of the user.

9. A contents providing system that provides contents to multiple devices, the system comprising:
    a first service hardware system configured to authenticate a user with a first user ID and provide contents of a file format for a first service to a first device of the user;
    a second service hardware system configured to authenticate the user with a second user ID and provide the contents of a file format for a second service to a second device of the user; and
    a multi-screen service providing server configured to receive from the first service system usage information of the contents used in the first device and provide the usage information to the second service system so as to be used in the second device,
    wherein the multi-screen service providing server is further configured to generate a main user ID mapped to the first user ID and the second user ID, assign a same ID to the respective contents, and map the usage information onto the main user ID, and
    wherein the first service system and the second service system interoperates with the multi-screen service providing server through application program interfaces (APIs) provided from the multi-screen service providing server.

10. The contents providing system of claim 9, wherein the multi-screen service providing server is further configured to receive the usage information of the contents used in the second device from the second service system and provide the usage information of the contents used in the second device to the first service system so as to be used in the first device.

11. The contents providing system of claim 10, wherein the usage information of the contents comprises one from among a purchase date and time, and a playback stop point of the contents used by the user in the first service system or the second service system and the user IDs of the user.

12. The contents providing system of claim 11, wherein the second service system provides to the second device the contents which are played and stopped in the first device, from the playback stop point.

13. The contents providing system of claim 12, wherein the first service system provides to the first device the contents which are played and stopped in the second device, from the playback stop point.

* * * * *